US008977042B2

(12) United States Patent
Huo et al.

(10) Patent No.: US 8,977,042 B2
(45) Date of Patent: Mar. 10, 2015

(54) ROTATION-FREE RECOGNITION OF HANDWRITTEN CHARACTERS

(75) Inventors: Qiang Huo, Beijing (CN); Jun Du, Beijing (CN)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 13/575,021

(22) PCT Filed: Mar. 23, 2012

(86) PCT No.: PCT/CN2012/072891
§ 371 (c)(1),
(2), (4) Date: Jul. 24, 2012

(87) PCT Pub. No.: WO2013/139032
PCT Pub. Date: Sep. 26, 2013

(65) Prior Publication Data
US 2013/0251249 A1 Sep. 26, 2013

(51) Int. Cl.
*G06K 9/62* (2006.01)
*G06K 9/00* (2006.01)
*G06K 9/32* (2006.01)
*G06K 9/42* (2006.01)

(52) U.S. Cl.
CPC .......... *G06K 9/6256* (2013.01); *G06K 9/00409* (2013.01); *G06K 9/3283* (2013.01); *G06K 9/42* (2013.01); *G06K 2209/011* (2013.01)
USPC ....................................................... 382/161

(58) Field of Classification Search
None
See application file for complete search history.

(56) References Cited

U.S. PATENT DOCUMENTS

| 5,389,745 | A | | 2/1995 | Sakamoto |
| 5,615,285 | A | * | 3/1997 | Beernink ...................... 382/189 |
| 6,956,969 | B2 | * | 10/2005 | Loudon et al. ............... 382/185 |
| 7,567,730 | B2 | * | 7/2009 | Ohguro ......................... 382/290 |
| 2005/0041865 | A1 | * | 2/2005 | Zhen et al. .................... 382/187 |
| 2009/0136136 | A1 | | 5/2009 | Mori et al. |
| 2009/0304296 | A1 | | 12/2009 | Zhang et al. |
| 2010/0246941 | A1 | | 9/2010 | Huo et al. |

OTHER PUBLICATIONS

Onuma, et al. An on-line handwritten Japanese Text Recognition System Free from Line Direction and Character Orientation Constraints), IEEE, vol. E88-D, No. 8, pp. 1823-1830, Aug. 2005.*
Yan et al., "Designing an MPI-Based Parallel and Distributed Machine Learning Platform on Large-Scale HPC Clusters," anticipated publication Mar. 31, 2012, 5 pages.

(Continued)

*Primary Examiner* — Daniel Mariam
(74) *Attorney, Agent, or Firm* — Dan Choi; Judy Yee; Micky Minhas

(57) ABSTRACT

A character recognition system receives an unknown character and recognizes the character based on a pre-trained recognition model. Prior to recognizing the character, the character recognition system may pre-process the character to rotate the character to a normalized orientation. By rotating the character to a normalized orientation in both training and recognition stages, the character recognition system releases the pre-trained recognition model from considering character prototypes in different orientations and thereby speeds up recognition of the unknown character. In one example, the character recognition system rotates the character to the normalized orientation by aligning a line between a sum of coordinates of starting points and a sum of coordinates of ending points of each stroke of the character with a normalized direction.

18 Claims, 5 Drawing Sheets

(56) References Cited

OTHER PUBLICATIONS

Bai et al., "A study on the use of 8-directional features for online handwritten Chinese character recognition," Proc. ICDAR, 2005, retrieved at <<http://ieeexplore.ieee.org/stamp/stamp.jsp?tp=&arnumber=1575550>>, pp. 262-266.

Feng et al., "Confidence Guided Progressive Search and Fast Match Techniques for High Performance Chinese/English OCR," Proceedings ICPR, 2002, retrieved at <<http://ieeexplore.ieee.org/stamp/stamp.jsp?tp=&arnumber=1047802>>, pp. 89-92.

GB18030: The New Chinese Encoding Standard, retrieved on Dec. 28, 2011 from <<http://www.gb18030.com/>>, 1 page.

He et al., "A character-structure-guided approach to estimating possible orientations of a rotated isolated online handwritten Chinese character," Proceedings ICDAR, 2009, retrieved at <<http://ieeexplore.ieee.org/stamp/stamp.jsp?arnumber=05277600>>, pp. 536-540.

He et al., "A study of a new misclassification measure for minimum classification error training of prototype-based pattern classifiers," Proceedings ICPR, 2008, retrieved from <<http://ieeexplore.ieee.org/stamp/stamp.jsp?tp=&arnumber=4761909>>, 4 pages.

Huang et al., "A Novel Approach for Rotation Free Online Handwritten Chinese Character Recognition," In Proceedings of 10th International Conference on Document Analysis and Recognition, Jul. 26-29, 2009, retrieved at <<www.cvc.uab.es/icdar2009/papers/3725b136.pdf>>, pp. 1136-1140.

Huang, "A Study on Recognition for Rotated Isolated Online Handwritten Chinese Character," (in Chinese and supervised by Professor Lianwen Jin), South China University of Technology, China, 2010, 68 pages.

Igel et al., "Improving the Rprop learning algorithm," Proceedings 2nd Int. Symp. on Neural Computation, Academic Press, 2000, retrieved at <<http://citeseer.ist.psu.edu/viewdoc/download;jsessionid=5DFEFFEF4B33583C3076AB85E872DE60?doi=10.1.1.17.1332&rep=rep1&type=pdf>> pp. 115-121.

Long et al., "A novel orientation free method for online unconstrained cursive handwritten Chinese word recognition," Proceedings ICPR, 2008, retrieved at <<http://ieeexplore.ieee.org/stamp/stamp.jsp?tp=&arnumber=4761544>>, 4 pages.

Mahender et al., "Structure based Feature Extraction of Handwritten Marathi Word," In International Journal of Computer Applications (0975-8887) vol. 16, No. 6, Feb. 2011, retrieved at <<http://www.ijcaonline.org/volume16/number6/pxc3872718.pdf>>, pp. 42-47.

Nakagawa et al., "A model of on-line handwritten Japanese text recognition free from line direction and writing format constraints," IEICE Trans. on Information and Systems, vol. E88-D, Aug. 2005, retrieved at <<http://www.tuat.ac.jp/~nakagawa/pub/2005/pdf/e88-d_8_1815.pdf>>, pp. 1815-1822.

Nakagawa et al., "On-line handwritten Japanese text recognition free from constraints on line direction and character orientation," Proceedings ICDAR, 2003, retrieved at <<http://ieeexplore.ieee.org/stamp/stamp.jsp?tp=&arnumber=1227719>> pp. 519-523.

Nassey, "Signature Pattern Recognition Using Pseudo Zernike Moments and a Fuzzy Logic Classifier," In Proceedings of International Conference on Image Processing, vol. 2, Sep. 16-19, 1996, retrieved at <<http://ieeexplore.ieee.org/ielx3/4140/12216/00560637.pdf?tp=&arnumber=560637&isnumber=12216 >>, pp. 197-200.

Riedmiller et al., "A direct adaptive method for faster backpropagation learning: the RPROP algorithm," Proceedings ICNN, 1993, retrieved at <<http://ieeexplore.ieee.org/stamp/stamp.jsp?tp=&arnumber=298623>>, pp. 586-591.

Wang et al., "A study of designing compact recognizers of handwritten Chinese characters using multiple-prototype based classifiers," Proceedings ICPR, 2010, retrieved at <<http://ieeexplore.ieee.org/stamp/stamp.jsp?arnumber=05597229>>, pp. 1872-1875.

\* cited by examiner

… (1)

ROTATION-FREE RECOGNITION OF HANDWRITTEN CHARACTERS

RELATED APPLICATION

This application is a national stage application of an international patent application PCT/CN2012/072891, filed Mar. 23, 2012, entitled "Rotation-Free Recognition of Handwritten Characters," which application is hereby incorporated by reference in its entirety.

BACKGROUND

Character recognition allows automatically recognizing an unknown character based on a trained recognition model with little or no human intervention. A number of character recognition algorithms have been developed and employed in real-world applications including, for example, optical character recognition applications for translating scanned images of handwritten, typewritten and/or printed documents.

Recent developments of mobile device technology open up a new opportunity for character recognition. Due to a small form factor of mobile devices, the mobile devices usually do not include a keyboard for user input. Even if a keyboard is provided by a mobile device, the keyboard tends to be very small and inconvenient to use, especially when a large amount of words or characters are needed to be input. Given this situation, character recognition has been considered as a plausible solution to this input problem. A user may input characters through a touch screen or a tablet of a mobile device and a recognition application of the mobile device may then recognize or translate the inputted characters based on a character recognition model. The use of character recognition not only saves the user from inputting the characters through a tiny keyboard, if any exists, but also reduces errors incurred because of mistakenly touching a wrong button on the keyboard due to a small size of the keyboard.

Although character recognition is welcome as a solution that is superior over a tiny keyboard, adopting character recognition in a mobile device is not without a problem. Generally, an accuracy of existing character recognition relies heavily on whether a character to be recognized is received in a predefined orientation, for example, in an upright position. The accuracy of the existing character recognition is sharply deteriorated as the character to be recognized deviates from the predefined orientation. In other words, the existing character recognition is not invariant to an orientation of a character to be recognized.

SUMMARY

This summary introduces simplified concepts of character recognition, which are further described below in the Detailed Description. This summary is not intended to identify essential features of the claimed subject matter, nor is it intended for use in limiting the scope of the claimed subject matter.

This application describes example embodiments of character recognition. In one embodiment, a plurality of training characters, e.g., East Asian characters such as Chinese characters, Japanese characters, Korean character, etc., may be received. In one embodiment, prior to extracting features of each training character, each training character may first be rotated to a normalized orientation. By way of example and not limitation, each character may be rotated based on information of at least two points, e.g., a starting point and an ending point, of each stroke of the respective character. In some embodiments, after the plurality of training characters have been rotated, features of each training character may be extracted and used for training a recognition model. In one embodiment, upon training the recognition model, parameters of the recognition model may further be compressed or reduced. For example, parameters of the recognition model may be quantized. Additionally or alternatively, a tree may be constructed to facilitate recognition of an incoming character using the trained recognition model at run time.

In some embodiments, once a recognition model exists, a new unknown character may be received. The new unknown character may include one or more strokes. In one embodiment, prior to recognizing the new unknown character using the trained recognition model, the new unknown character may be rotated to a normalized orientation, for example, based on at least two points (e.g., a starting point and an ending point) of each stroke of the new unknown character. After the new unknown character is rotated to the normalized orientation, the rotated character may be recognized using the trained recognition model.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
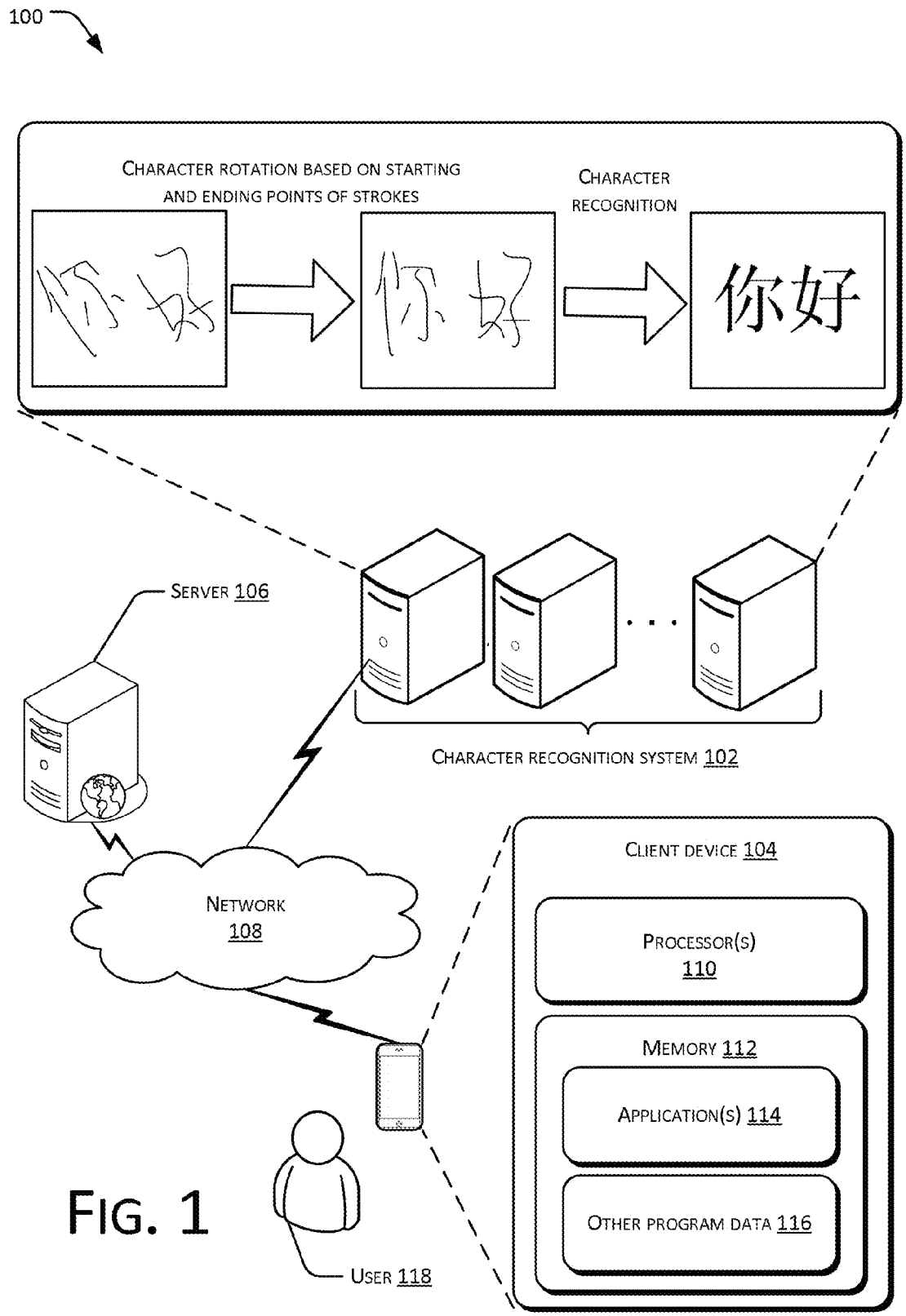
FIG. 1 illustrates an example environment including an example character recognition system.

As noted above, a recognition accuracy of existing character recognition models depends heavily on whether a given character is received in a predetermined orientation. Any deviation of the given character from the predetermined orientation deteriorates the recognition accuracy of the character recognition models and renders the models error-prone. Often, users will input handwritten characters at angles that deviate from the predetermined orientation. This is particularly true when inputting characters via a touch screen of a mobile device, which may not be held at an anticipated orientation.

This disclosure describes a character recognition system, which rotates an incoming character to a normalized orientation prior to recognizing or translating the incoming character using a pre-trained recognition model. The normalized orientation need not necessarily correspond to a vertical or horizontal orientation of the character.

Generally, during a training stage of character recognition, the described system may receive training data, for example, a plurality of textual characters. The plurality of textual characters may include, but are not limited to, East Asian characters (such as Chinese characters, Korean characters, Japanese characters, etc.) and Middle East characters (such as Hebrew characters, Greek characters, Arabic characters, etc.). In one embodiment, the described system may pre-process each character by rotating each character to a respective normalized orientation (or by a respective angle of rotation) that is characteristic of relationship between at least two points (for example, a starting point and an ending point) of one or more strokes of a respective character. By way of example and not limitation, the described system may rotate a character to align a line from a weighted sum of coordinates of starting points of one or more strokes of the character to a weighted sum of coordinates of ending points of the one or more strokes of the character (or vice versa) with a predetermined normalized direction. In one embodiment, the one or more strokes of the character may include, for example, each stroke of the character, a subset of strokes of the character having properties (e.g., lengths) greater than or equal to a predetermined threshold, etc.

Upon rotating the plurality of characters, the described system may extract features from the plurality of rotated characters. Further, the described system may construct a recognition model (or classifier) based on the extracted features. In some embodiments, the described system may further refine the recognition model. For example, the described system may refine the recognition model with an objective function using an optimization algorithm (for example, resilient propagation (Rprop) algorithm, etc.). Additionally or alternatively, the described system may compress parameters of the recognition model using a technique such as split vector quantization (VQ) technique. Additionally or alternatively, in one embodiment, the described system may construct a tree, such as a two-level fast-match tree, for use to speed up recognition of an incoming or unknown character at run time using the recognition model.

In some embodiments, during a recognition stage, the described system may receive an incoming character, for example, that is inputted by a user. By way of example and not limitation, the described system may receive the incoming character inputted by the user through a touch screen or a tablet of a device that is written with a finger, a digital pen, a mouse, or the like. Additionally or alternatively, the described system may receive the incoming character from a document to be recognized or translated.

In response to receiving the incoming character, the described system may pre-process the incoming character, for example, by rotating the incoming character based on information of relationship between at least two points (for example, a starting point and an ending point) of one or more strokes of the incoming character as described above. Upon rotating the incoming character, the described system may extract features from the incoming character and recognize or translate the incoming character based on the extracted features and the pre-trained recognition model. In one embodiment, the described system may speed up recognition of the incoming character using the constructed two-level fast-match tree, for example. Upon successfully recognizing or translating the incoming character, the described system may provide a recognition result to the device which may display the recognition result to the user through a display (e.g., the touch screen) thereof or transmit the recognition result to an application therein for further manipulation. In some instances, the described system may perform recognition of an incoming character or part of a text at runtime substantially contemporaneously with the user inputting the incoming character or the text, while in other instances, the described system may perform recognition of an incoming character or part of a text after the user has entered the incoming character or the text.

The described system rotates an incoming character by an angle that is characteristic of one or more strokes of the incoming character, and transforms the incoming character to a normalized orientation for facilitating recognition of the incoming character. By rotating the incoming character to a normalized orientation prior to recognition, the described system allows character recognition to be less sensitive or more invariant to a received orientation of the incoming character, and thus increases a recognition accuracy of the character recognition model.

While in the examples described herein, the character recognition system rotates a character, extracts features from the character, recognizes the character, constructs a recognition model, refines the recognition model, compresses parameters of the recognition model, and constructs a search tree, and in other embodiments, these functions may be performed by multiple separate systems or services. For example, in one embodiment, a pre-processing service may pre-process the character, while a training service may train a recognition model, while a separate service may refine and/or compress the recognition model, and yet another service may recognize characters based on the recognition model.

The application describes multiple and varied implementations and embodiments. The following section describes an example environment that is suitable for practicing various implementations. Next, the application describes example systems, devices, and processes for implementing a character recognition system.

Exemplary Environment

FIG. 1 illustrates an exemplary environment 100 usable to implement a character recognition system 102. In one embodiment, the environment 100 may include a client device 104, a server 106 and a network 108. The client device 104 and/or the server 106 may communicate data with the character recognition system 102 via the network 108.

Although the character recognition system 102 in FIG. 1 is described to be separate from the client device 104 and the server 106, in one embodiment, functions of the character recognition system 102 may be included and distributed among one or more client devices 104 and/or one or more servers 106. For example, the client device 104 may include part of the functions of the character recognition system 102 while other functions of the character recognition system 102 may be included in the server 106. In some embodiments, all the functions of the character recognition system 102 may be included in the client device 104 or the server 106.

The client device 104 may be implemented as any of a variety of conventional computing devices including, for example, a notebook or portable computer, a handheld device, a netbook, an Internet appliance, a portable reading device, an electronic book reader device, a tablet or slate computer, a game console, a mobile device (e.g., a mobile phone, a personal digital assistant, a smart phone, etc.), a media player, etc. or a combination thereof.

The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANs). Further, the individual networks may be wireless or wired networks, or a combination thereof.

In one embodiment, the device 104 includes one or more processors 110 coupled to memory 112. The memory 112 includes one or more applications 114 (e.g., a character recognition application, a writing application, etc.) and other program data 116. The memory 112 may be coupled to, associated with, and/or accessible to other devices, such as network servers, routers, the server 106, and/or other client devices (not shown).

A user 118 of the client device 104 may want to input a character to the client device 104. For example, the user may employ a writing application of the client device 104 to write a character using a finger, a digital pen, a stylus, a mouse or the like on a touch screen, a tablet or other display of the client device 104. The writing application in this example may comprise a front-end application that may obtain a recognition result of the written character by communicating character data with the character recognition system 102 as a backend.

In response to receiving the character data from the writing application, the character recognition system 102 may recognize the character using a pre-trained recognition model included therein and return a recognition result to the writing application. For example, the character recognition system 102 may return a recognized textual result (e.g., in a specified font) to the writing application. In some embodiments, the character recognition system 102 or another system or application of the client device 104 or the server 106 may also translate the character from one language into another (e.g., Chinese to English).

In other embodiments, in which the client device 104 has sufficient processing capabilities, the character recognition may be implemented entirely by character recognition functionality (e.g., the functions of the character recognition system 102) at the client device 104.

Figure 2:
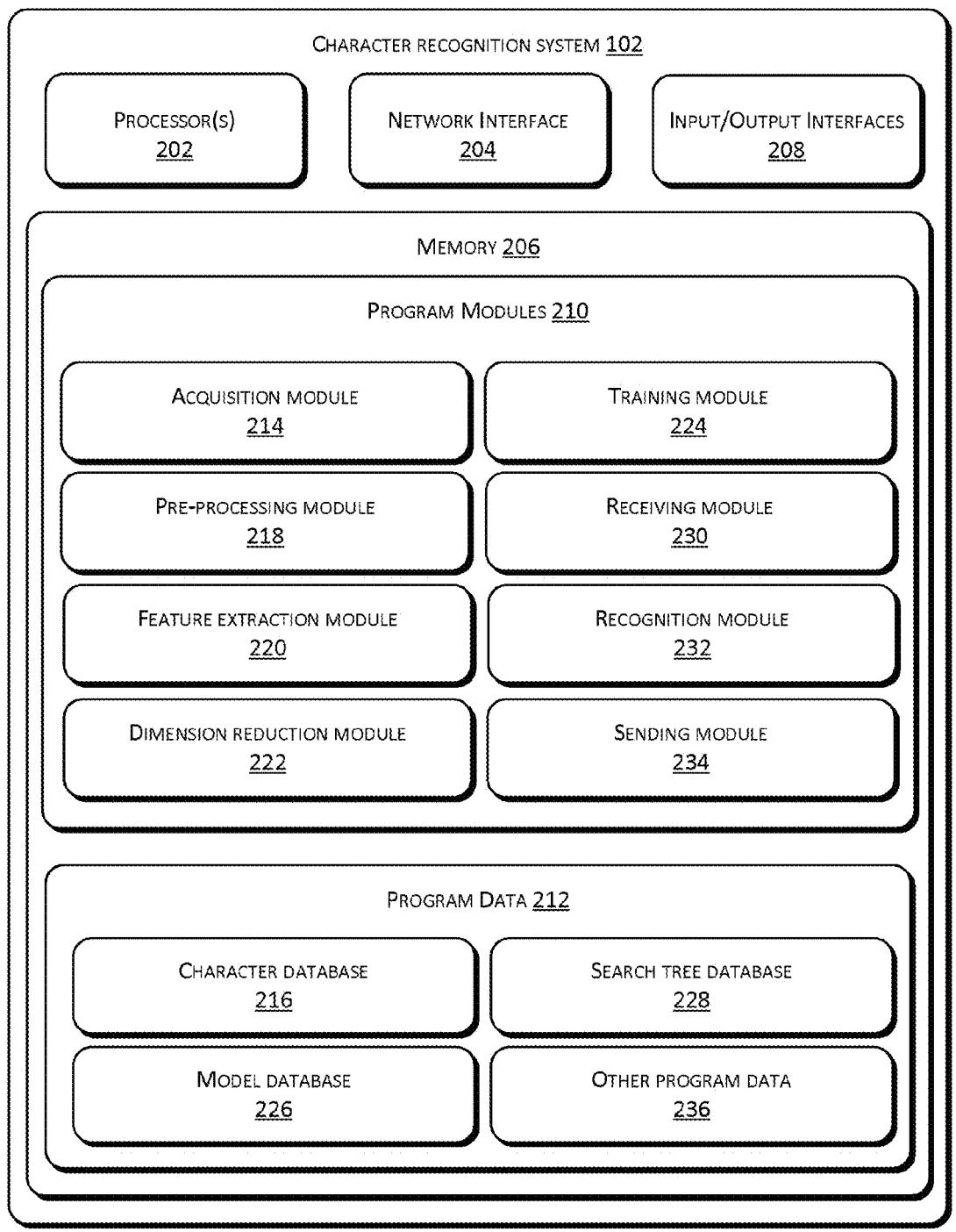
FIG. 2 illustrates the example character recognition system of FIG. 1 in more detail.

FIG. 2 illustrates the character recognition system 102 in more detail. In one embodiment, the character recognition system 102 includes, but is not limited to, one or more processors 202, a network interface 204, memory 206, and an input/output interface 208. The processor(s) 202 is configured to execute instructions received from the network interface 204, received from the input/output interface 208, and/or stored in the memory 206.

The memory 206 may include computer-readable media in the form of volatile memory, such as Random Access Memory (RAM) and/or non-volatile memory, such as read only memory (ROM) or flash RAM. The memory 206 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

The memory 206 may include program modules 210 and program data 212. In one embodiment, the program modules 210 may include an acquisition module 214. The acquisition module 214 may obtain or retrieve data for training a recognition model from, for example, a character database 216 included in the character recognition system 102. Additionally or alternatively, the acquisition module 214 may obtain or retrieve training data from the client device 104 and/or server 106. In one embodiment, the training data may include, but is not limited to, previously scanned or captured copies of handwritten characters (of a particular user such as the user 118 or a plurality of users) that have been written with a finger, a stylus, etc., on a touch screen or tablet, for example, and typed characters, etc. In some embodiments, the training data may further include information about a writing trajectory of each stroke of each character. By way of example and not limitation, the trajectory information of a character may include, for example, temporal (e.g., timestamp) and spatial (e.g., coordinates) information of writing each stroke of the character. Additionally or alternatively, the training characters may include textual characters of a linguistic language including, for example, East Asian characters (e.g., Chinese characters, Korean characters, Japanese character, etc.), Middle East characters (such as Arabic characters, Hebrew characters, etc.), etc. In one embodiment, a character of the training characters or a character to be recognized may include L strokes, with a kth stroke of the character represented as a sequence of points $P^k=(P_1^k, P_2^k, \ldots, P_n^k, \ldots, P_{N_k}^k)$, where $P_n^k=(x_n^k, y_n^k)$ is a coordinate of the nth point of the kth stroke.

In response to obtaining the training data, the character recognition system 102 may further include a pre-processing module 218 to pre-process the training data to facilitate subsequent training of a recognition model. In one embodiment, the pre-processing module 218 may rotate a character of the training data by an angle (or to an orientation) that is characteristic of information of one or more strokes of the character.

In one embodiment, the pre-processing module 218 may rotate the character independent of an order of the one or more strokes of the character written by the user 118. For example, the pre-processing module 218 may rotate the character based on information of one or more points of one or more strokes of the character. In one embodiment, the one or more points may include, but are not limited to, a starting point, an ending point, a middle point, etc. Furthermore, the one or more strokes of the character may include, for example, all strokes of the character, a subset of strokes of the character having properties (e.g., lengths, etc.) greater than or equal to a predetermined threshold, etc. Additionally or alternatively, the one or more strokes of the character may include a predetermined number (or percentage) of the strokes of the character having properties (such as lengths, etc.) to be the highest in rank, and/or a first stroke and a last stroke of the character, etc.

Additionally or alternatively, the one or more strokes of the character may include, for example, remaining strokes of the character after ignoring strokes that are very likely prone to errors. For example, the pre-processing module 218 may ignore a stroke of the character if the stroke has a very short length, for example, less than a predetermined threshold or as compared to the rest of the strokes of the character (such as an average length of the strokes of the character).

Figure 3:
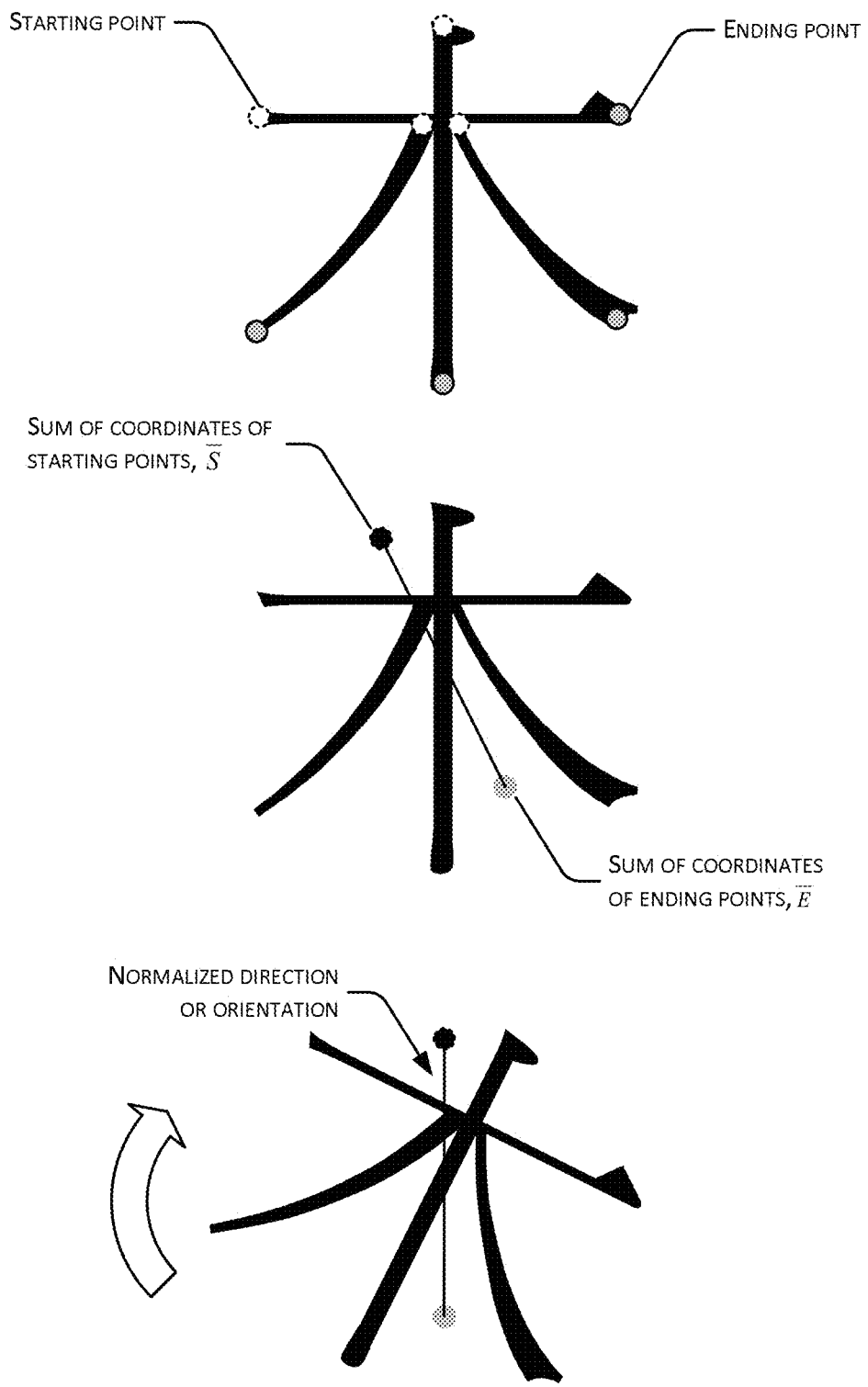
FIG. 3 illustrates an example scenario of rotating a received character during training and/or recognition.

By way of example and not limitation, upon receiving a given character (a training character or a character to be recognized), the pre-processing module 218 may compute a weighted sum for each of the one or more points of the one or more strokes of the character. The weighted sum may include, but is not limited to, a simple arithmetic sum, a sum weighted with respective lengths of associated one or more strokes (e.g., a weight coefficient is directly proportional to a length of associated stroke, etc.), etc. In one embodiment, as shown in FIG. 3, the pre-processing module 218 may, for example, compute simple arithmetic sums for starting points and ending points of each stroke of the character:

$$\overline{S} = \sum_{k=1}^{L} P_1^k \quad (1)$$

$$\overline{E} = \sum_{k=1}^{L} P_{N_k}^k \quad (2)$$

with $(x_{\overline{S}}, y_{\overline{S}})$ and $(x_{\overline{E}}, y_{\overline{E}})$ representing coordinates of $\overline{S}$ and $\overline{E}$ respectively.

In one embodiment, the pre-processing module 218 may rotate or transform the character to cause a direction from $\overline{S}$ to $\overline{E}$ (or a line between $\overline{S}$ and $\overline{E}$) to be a predetermined or normalized direction or orientation, e.g., vertically downward (or upright). By way of example and not limitation, the pre-processing module 218 may rotate the character using the following transformation:

$$(x_n^k)_{new} = x_n^k \sin\theta - y_n^k \cos\theta \quad (3)$$

$$(y_n^k)_{new} = y_n^k \sin\theta + x_n^k \cos\theta \quad (4)$$

where $\theta$ represents the direction from $\overline{S}$ to $\overline{E}$, and satisfies the following equations:

$$\cos\theta = \frac{x_{\overline{E}} - x_{\overline{S}}}{\sqrt{(x_{\overline{E}} - x_{\overline{S}})^2 + (y_{\overline{E}} - y_{\overline{S}})^2}} \quad (5)$$

$$\sin\theta = \frac{y_{\overline{E}} - y_{\overline{S}}}{\sqrt{(x_{\overline{E}} - x_{\overline{S}})^2 + (y_{\overline{E}} - y_{\overline{S}})^2}} \quad (6)$$

Given the above rotation invariant transformation, the pre-processing module 218 may rotate or transform each training character in the training data to transform each character to a respective normalized orientation to facilitate a rotation-free or orientation-free recognition of a recognition model trained by the character recognition system 102 thereafter.

Additionally or alternatively, in some embodiments, the pre-processing module 218 may rotate the character based on directions (or vectors) of the one or more strokes of the character. For example, the pre-processing module 218 may compute a vector sum of the directions from starting points to ending points (or vice versa) of the one or more strokes of the character. The pre-processing module 218 may then rotate the character to align the vector sum to a predetermined direction, e.g., vertically downward or upwards, horizontally from left to right or from right or left, or in a predetermined angle from horizontal, etc.

Additionally or alternatively, in at least one embodiment, the pre-processing module 218 may further scale each character to a predetermined size. In one embodiment, the pre-processing module 218 may rescale a character based on a distance between the weighted sum of the starting points of the one or more strokes of the character and the weighted sum of the ending points of the one or more strokes of the character. For example, the pre-processing module 218 may scale a character to cause the distance between the weighted sum of the starting points of the one or more strokes of the character and the weighted sum of the ending points of the one or more strokes of the character to have a predetermined length. In some embodiments, the pre-processing module 218 may alternatively rescale the character to cause the vector sum of the directions from respective starting points to respective ending points (or vice versa) of the one or more strokes of the character to have a predetermined magnitude. Additionally or alternatively, the pre-processing module 218 may rescale the character using one or more conventional scaling methods.

In some embodiments, the pre-processing module 218 may further filter noises in the training characters. The noises in the training characters may include, but are not limited to, a noise due to scanning of the training characters, a noise due to reduction in resolution of images of the training characters, etc. In one embodiment, the pre-processing module 218 may filter the noises in the training characters using a low-pass filter.

Upon pre-processing the training characters (e.g., rotating the training characters to respective normalized directions or orientations), the character recognition system 102 may further include a feature extraction module 220 to extract features or feature vectors from each training character of the training data. In one embodiment, the feature extraction module 220 may extract directional features (such as north, east, south, west, etc.) of a (rotated) training character by analyzing trajectories of the strokes of the training character. In some embodiments, the feature extraction module 220 may employ a feature extraction algorithm as described in Z. L. Bai et al., "A Study on the Use of 8-Directional Features for Online Handwritten Chinese Character Recognition," *Proceedings of the Eighth International Conference on Document Analysis and Recognition*, 2005. Additionally or alternatively, the feature extraction module 220 may extract the features of each training character using one or more conventional feature extraction algorithms including, for example, wavelet transform, Gabor filtering, gradient features, etc.

In one embodiment, upon extracting the features of each training character, the character recognition system 102 may further include a dimension reduction module 222 to reduce the number of dimensions of the extracted features to obtain lower-dimensional features. In one embodiment, the dimension reduction module 222 may reduce the number of dimensions of the extracted features using one or more dimensionality reduction algorithms including, for example, linear discriminant analysis (LDA), principal component analysis (PCA), independent component analysis (ICA), singular value decomposition (SVD), factor analysis (FA), etc.

In some embodiments, the character recognition system 102 may further include a training module 224. The training module 224 may train a recognition model based on the extracted features of the training characters. By way of example and not limitation, the recognition model may include a multi-prototype based classifier including a plurality of character classes denoted as $\{C_i | i=1, \ldots, M\}$, where M represents the number of character classes. In one embodiment, the training module 224 may construct multi-prototype based classifier or the plurality of character classes using, for example, a clustering algorithm. Examples of the clustering algorithm may include, but are not limited to, Linde-Buzo-Gray (LBG) clustering algorithm, self-organizing map (SOM) algorithm, k-means clustering algorithm, hierarchical clustering algorithm, density based clustering algorithm, distribution-based clustering algorithm, etc.

In one embodiment, given a set of training features (i.e., the extracted features of the training characters), $X=\{x_r \in R^D | r=1, \ldots, R\}$ with respective labels $L=\{i_r=1, \ldots, R\}$, where D represents the number of dimensions of the training features and R represents the number of training features, the training module 224 may represent each class $C_i$ by $K_i$ prototypes, with $\lambda_i = \{m_{ik} \in R^D | k=1, \ldots K_i\}$, where $m_{ik}$ represents the kth prototype of the ith class $C_i$. With $\Lambda = \{\lambda_i\}$ denoting a set of prototypes of the multi-prototype based classifier (or recognition model), the training module 224 may estimate or refine the set of prototypes, Λ, by minimizing an objective function using an optimization algorithm, for example. By way of example and not limitation, the training module 224 may employ a sample-separation-margin (SSM) based minimum classification error (MCE) objective function. For example, the training module 224 may employ the following objective function for estimating the set of prototypes in the recognition model:

$$l(X, L; \Lambda) = \frac{1}{R}\sum_{r=1}^{R} \frac{1}{1+\exp[-\alpha d(x_r, i_r; \Lambda)+\beta]} \quad (7)$$

In Equation (7), α (e.g., 7, etc.) and β (e.g., 0, etc.) represent two control parameters, and $d(x_r, i_r; \Lambda)$ represents a misclassification measure defined by the SSM as described in the following:

$$d(x_r, i_r; \Lambda) = \frac{-g_{i_r}(x_r; \lambda_{i_r}) + g_q(x_r; \lambda_q)}{\|m_{i_r \hat{k}} - m_{q \bar{k}}\|} \quad (8)$$

where $$\hat{k} = \arg\min_k \|x_r - m_{i_r k}\|^2 \quad (9)$$

$$q = \arg\max_{i \in M_r} g_i(x_r; \lambda_i) \quad (10)$$

$$\bar{k} = \arg\min_k \|x_r - m_{qk}\|^2 \quad (11)$$

and $M_r$ is a hypothesis space for the rth sample, excluding the true label $i_r$.

In one embodiment, the training module 224 may optimize or minimize the objective function using a Quickprop or modified Quickprop procedure as described in Y. Q. Wang et al., "A Study of Designing Compact Recognizers of Handwritten Chinese Characters Using Multiple-Prototype Based Classifier," *Proc. ICPR* 2010, pp. 1872-1875. In some embodiments, the training module 224 may optimize or minimize the objective function using an improved resilient propagation (Rprop) algorithm. By way of example and not limitation, the training module 224 may optimize or minimize the objective function using the following procedures:

At iteration t=0, the training module 224 may define an increase factor, $\eta^+$ (e.g., 1.1, 1.2, etc.) and a decrease factor, $\eta^-$ (e.g., 0.1, 0.5, etc.). In one embodiment, the training module 224 may define the increase factor and the decrease factor with a relationship, for example, $0<\eta^-<1<\eta^+$. In some embodiments, the training module 224 may further compute a derivative of $l(X,L; \Lambda)$ defined in Equation (7) with respect to each $m_{ikd}$ and update prototype parameters indicated as follows:

$$m_{ikd}^{(t+1)} = m_{ikd}^{(t)} - sign\left(\frac{\partial l(X, L; \Lambda^{(t)})}{\partial m_{ikd}}\right)\Delta_{ikd}^{(t)} \quad (12)$$

$$\Delta m_{ikd}^{(t)} = -sign\left(\frac{\partial l(X, L; \Lambda^{(t)})}{\partial m_{ikd}}\right)\Delta_{ikd}^{(t)} \quad (13)$$

$m_{ikd}$ is the dth element of $m_{ik}$, $m_{ikd}^{(t)} = m_{ikd}$. $\Delta_{ikd}^{(t)} = \Delta_0$, an initial step size (e.g., 0.01, 0.05, etc.) with $\Delta_{max}$ (such as 50, 40, etc.) and $\Delta_{min}$ (such as 0, 1, etc.) being an upper bound and a lower bound of allowable step size respectively. Furthermore, $$\frac{\partial l(X, L; \Lambda^{(t)})}{\partial m_{ikd}}$$

is defined as:

$$\frac{\partial l(X, L; \Lambda^{(t)})}{\partial m_{ikd}} \triangleq \frac{\partial l(X, L; \Lambda)}{\partial m_{ikd}}\bigg|_{\Lambda=\Lambda^{(t)}} \quad (14)$$

At iteration t=t+1, a parameter, S, is defined as follows:

$$S = \frac{\partial l(X, L; \Lambda^{(t-1)})}{\partial m_{ikd}} \cdot \frac{\partial l(X, L; \Lambda^{(t)})}{\partial m_{ikd}} \quad (15)$$

In one embodiment, the training module 224 may employ one or more improved versions of Rprop algorithms to significantly improve a learning speed of the recognition model. For example, the training module 224 may employ the following one or more improved versions of Rprop algorithms for updating parameters of the recognition model (or the prototypes):

Rprop−:

$$\Delta_{ikd}^{(t)} = \begin{cases} \min(\eta^+\Delta_{ikd}^{(t-1)}, \Delta_{max}) & \text{if } S > 0 \\ \max(\eta^-\Delta_{ikd}^{(t-1)}, \Delta_{min}) & \text{if } S < 0 \\ \Delta_{ikd}^{(t-1)} & \text{else} \end{cases} \quad (16)$$

$$m_{ikd}^{(t+1)} = m_{ikd}^{(t)} - sign\left(\frac{\partial l(X, L; \Lambda^{(t)})}{\partial m_{ikd}}\right)\Delta_{ikd}^{(t)} \quad (17)$$

Rprop+:

If $S > 0$, $$\Delta_{ikd}^{(t)} = \min(\eta^+\Delta_{ikd}^{(t-1)}, \Delta_{max}) \quad (18)$$

$$\Delta m_{ikd}^{(t)} = -sign\left(\frac{\partial l(X, L; \Lambda^{(t)})}{\partial m_{ikd}}\right)\Delta_{ikd}^{(t)} \quad (19)$$

$$m_{ikd}^{(t+1)} = m_{ikd}^{(t)} + \Delta m_{ikd}^{(t)} \quad (20)$$

if $S < 0$, $$\Delta_{ikd}^{(t)} = \max(\eta^-\Delta_{ikd}^{(t-1)}, \Delta_{min}) \quad (21)$$

$$m_{ikd}^{(t+1)} = m_{ikd}^{(t)} - \Delta m_{ikd}^{(t-1)} \quad (22)$$

$$\frac{\partial l(X, L; \Lambda^{(t)})}{\partial m_{ikd}} = 0 \quad (23)$$

else, $$\Delta_{ikd}^{(t)} = \Delta_{ikd}^{(t-1)} \quad (24)$$

$$\Delta m_{ikd}^{(t)} = -sign\left(\frac{\partial l(X, L; \Lambda^{(t)})}{\partial m_{ikd}}\right)\Delta_{ikd}^{(t)} \quad (25)$$

$$m_{ikd}^{(t+1)} = m_{ikd}^{(t)} + \Delta m_{ikd}^{(t)} \quad (26)$$

iRprop−:

$$\Delta_{ikd}^{(t)} = \begin{cases} \min(\eta^+ \Delta_{ikd}^{(t-1)}, \Delta_{max}) & \text{if } S > 0 \\ \max(\eta^- \Delta_{ikd}^{(t-1)}, \Delta_{min}) & \text{if } S < 0 \\ \Delta_{ikd}^{(t-1)} & \text{else} \end{cases} \quad (27)$$

$$\frac{\partial l(X, L; \Lambda^{(t)})}{\partial m_{ikd}} = 0 \text{ if } S < 0 \quad (28)$$

$$m_{ikd}^{(t+1)} = m_{ikd}^{(t)} - sign\left(\frac{\partial l(X, L; \Lambda^{(t)})}{\partial m_{ikd}}\right)\Delta_{ikd}^{(t)} \quad (29)$$

iRprop+:

If $S > 0$, $$\Delta_{ikd}^{(t)} = \min(\eta^+ \Delta_{ikd}^{(t-1)}, \Delta_{max}) \quad (30)$$

$$\Delta m_{ikd}^{(t)} = -sign\left(\frac{\partial l(X, L; \Lambda^{(t)})}{\partial m_{ikd}}\right)\Delta_{ikd}^{(t)} \quad (31)$$

$$m_{ikd}^{(t+1)} = m_{ikd}^{(t)} + \Delta m_{ikd}^{(t)} \quad (32)$$

if $S < 0$, $$\Delta_{ikd}^{(t)} = \max(\eta^- \Delta_{ikd}^{(t-1)}, \Delta_{min}) \quad (33)$$

$$m_{ikd}^{(t+1)} = m_{ikd}^{(t)} - \Delta m_{ikd}^{(t-1)} \text{ if } l(X, L; \Lambda^{(t)}) > l(X, L; \Lambda^{(t-1)}) \quad (34)$$

$$\frac{\partial l(X, L; \Lambda^{(t)})}{\partial m_{ikd}} = 0 \quad (35)$$

else, $$\Delta_{ikd}^{(t)} = \Delta_{ikd}^{(t-1)} \quad (36)$$

$$\Delta m_{ikd}^{(t)} = -sign\left(\frac{\partial l(X, L; \Lambda^{(t)})}{\partial m_{ikd}}\right)\Delta_{ikd}^{(t)} \quad (37)$$

$$m_{ikd}^{(t+1)} = m_{ikd}^{(t)} + \Delta m_{ikd}^{(t)} \quad (38)$$

In one embodiment, the training module 224 may repeat the above iteration for a predetermined number of times, ($T_R$−1) times, e.g., 100, 200, etc. Furthermore, the training module 224 may compute the derivative of the above objective function as follows:

$$\frac{\partial l_r}{\partial m_{i_r \hat{k}}} = \alpha l_r (1-l_r)\left[-\frac{x_r - m_{i_r \hat{k}}}{\|m_{i_r \hat{k}} - m_{q\bar{k}}\|} - d(x_r, i_r; \Lambda)\frac{m_{i_r \hat{k}} - m_{q\bar{k}}}{\|m_{i_r \hat{k}} - m_{q\bar{k}}\|^2}\right] \quad (39)$$

$$\frac{\partial l_r}{\partial m_{q\bar{k}}} = \alpha l_r (1-l_r)\left[-\frac{x_r - m_{q\bar{k}}}{\|m_{i_r \hat{k}} - m_{q\bar{k}}\|} - d(x_r, i_r; \Lambda)\frac{m_{q\bar{k}} - m_{i_r \hat{k}}}{\|m_{q\bar{k}} - m_{i_r \hat{k}}\|^2}\right] \quad (40)$$

where $$l_r = \frac{1}{1 + \exp[-\alpha d(x_r, i_r; \Lambda) + \beta]} \quad (41)$$

In some embodiments, upon refining or optimizing the recognition model, the training module 224 may compress the parameters of the recognition model. In one embodiment, the training module 224 may compress the parameters of the recognition model using a parameter compression algorithm or a parameter quantization algorithm, such as a split vector quantization (VQ) algorithm.

Additionally or alternatively, the training module 224 may construct a search tree to speed up recognition of incoming characters. In one embodiment, the training module 224 may construct a two-level fast-match tree by clustering the prototypes of all classes into a plurality of groups (e.g., G groups) using a clustering algorithm such as a k-means clustering algorithm. In some embodiments, the training module 224 may compute a centroid of each group as a sample mean of prototypes belonging to that group. Each group may include a bucket including one or more character classes with respective prototypes belonging to that group. In one embodiment, the training module 224 may classify a training character (or features of the training character) into a particular group if a distance (e.g., an Euclidean distance) between the training character (or features of the training character) and the centroid of that particular group is minimum among the plurality of groups. The training module 224 may then add a character class associated with that training character into the bucket of that particular group if the character class has not been added thereto. In some instances, the training module 224 may further sort the plurality of groups and/or the one or more character classes in respective buckets in a descending order, for example, based on respective number of training characters associated with the one or more character classes encountered in respective buckets of the groups.

In one embodiment, the character recognition system 102 may further include a model database 226 to store the trained recognition model. For example, the model database 226 may store a plurality of trained recognition models for a plurality of different linguistic characters such as East Asian characters including, for example, Chinese characters, Japanese characters, Korean characters, etc. In some embodiments, the character recognition system 102 may further include a search tree database 228 to store information of a search tree for the trained recognition model obtained by the character recognition system 102.

In some embodiments, the character recognition system 102 may further include a receiving module 230 to receive an incoming or unknown character inputted by the user 118 through the client device 104, for example. Additionally, in some embodiments, the receiving module 230 may further receive information associated with the incoming character. By way of example and not limitation, the receiving module 230 may receive information of a linguistic language to which the incoming character belongs. For example, the receiving module 230 may receive information of a linguistic language used by an application of the client device 104 from which the incoming or unknown character is received, and infer that this linguistic language is the same linguistic language to which the incoming character belongs. Additionally or alternatively, the receiving module 230 may receive the information of the linguistic language to which the incoming character belongs from the user 118. For example, the user 118 may indicate to the character recognition system 102 that the user 118 is writing a character of a particular linguistic language through an application of the client device 104. In one embodiment, in response to receiving the incoming character, the receiving module 230 may transfer the incoming character to the preprocessing module 218 to pre-process the incoming character. The pre-processing module 218 may pre-process the incoming character in the same manner as processing a training character during a training stage.

In one embodiment, upon pre-processing the incoming character, the pre-processing module 218 may transmit the pre-processed character to the feature extraction module 220 to extract features from the pre-processed character as described in the foregoing embodiments. Upon extracting the features of the pre-processed character, the character recognition system 102 may further include a recognition module 232 to recognize the incoming character based on the trained recognition model. In some embodiments, the recognition module 232 may compare the features of the incoming character with the recognition model. Using a multi-prototype based classifier as a pre-trained recognition model as an example. The recognition module 232 may compare the features of the incoming character with each class of the multi-prototype based classifier by evaluating, for example, an Euclidean distance based discriminant function for each class $C_i$ as follows:

$$g_i(x;\lambda_i) = -\min_k \|x - m_{ik}\|^2 \qquad (42)$$

In one embodiment, the recognition module 232 may select a class having the minimum Euclidean distance with the features of the incoming character or a class having the maximum discriminant function score as a recognized class, $r(x; \Lambda)$, of the incoming character, i.e., $$r(x;\Lambda) = \arg\max_i g_i(x;\Lambda_i) \qquad (43)$$

In alternative embodiments, the recognition module 232 may employ the pre-constructed search tree to speed up recognition of the incoming character. By way of example and not limitation, upon obtaining the extracted features of the incoming character, the recognition module 232 may compare the extracted features with centroids of the plurality of groups associated with the search tree (e.g., the two-level fast-match tree). The recognition module 232 may then sort or rank the plurality of groups in an ascending order of Euclidean distances between the extracted features of the incoming character and the centroids of the plurality of groups, having a rank to be higher for smaller Euclidean distance. Upon obtained a sorted list of the plurality of groups, the recognition module 232 may select the highest ranked group or a predetermined number (e.g., 2, 5, 10, etc.) of highest ranked groups in the sorted list, and compare the extracted features of the incoming character with character classes, $C_i$, that are included in the highest ranked group or the predetermined number (e.g., 2, 5, 10, etc.) of highest ranked groups in the sorted list. In one embodiment, the recognition module 232 may select a character class that has a minimum Euclidean distance with the extracted features of the incoming character as a recognized class for the incoming character from among these selected character classes, $C_i$.

In some embodiments, the recognition module 232 may select more than one character classes as recognized classes for the incoming character. By way of example and not limitation, the recognition module 232 may select a predetermined number of character classes (e.g., the first few character classes having the smallest Euclidean distances from the extracted features of the incoming character) from the trained recognition model as recognized classes for the incoming character. In one embodiment, the recognition module 232 may further include a confidence score for each selected character class, which may be in terms of a reciprocal of respective Euclidean distance with the features of the incoming character, for example.

In response to recognizing the incoming character, the character recognition system 102 may include a sending module 234 to send a recognition result to the client device 104 which may display the recognition result to the user 118 or transmit the recognition result to an application, such as the writing application, of the client device 104 for further manipulation. In one embodiment, the recognition result may include, for example, a translation result of a typed and clear character representing a recognized class of the incoming character if a single character class is selected as the recognized class for the incoming character. In some embodiments, the recognition result may include, a translation result of a plurality of typed and clear characters representing a plurality of recognized classes of the incoming character if more than one classes are selected as the recognized classes for the incoming character. In one embodiment, the plurality of typed and clear characters representing the plurality of recognized classes of the incoming character may be arranged in a descending order of respective confidence scores. In some embodiments, the recognition result may further include respective confidence scores for the recognized classes to allow the client device 104 for displaying to the user 118, for example.

In response to receiving the recognition result, the client device 104 may display the recognition result to the user 118 through a display or a touch screen thereof. In one embodiment, the client device 104 may further allow the user 118 to accept or reject the recognition result. Additionally or alternatively, in an event that more than one typed characters representing more than one recognized character classes are displayed, the client device 104 may further allow the user 118 to select a correct character class from the typed characters. In some embodiments, the client device 104 may send information of this selection or information of user acceptance or rejection of the recognition result to the character recognition system 102 for future re-training or refining of the trained recognition model stored in the character recognition system 102. In one embodiment, the character recognition system 102 may store this information in other program data 236 for future re-training and/or refining of the trained recognition model.

Alternative Embodiments

Although the foregoing embodiments describe the training characters and/or the incoming (or unknown) character to be online handwritten characters, i.e., characters having trajectory information (such as coordinates of starting points and ending points, or coordinates of sequences of points, for example) of strokes, the present disclosure is not limited thereto. In one embodiment, the character recognition system 102 may further be used for recognizing an incoming handwritten character (or typed characters) that include no trajectory information (such as coordinates of starting points and ending points, for example) of strokes thereof. In one embodiment, the character recognition system 102 may adopt one or more heuristic strategies or assumptions to determine trajectory information of each stroke of an incoming or unknown character. For example, the character recognition system 102 may adopt one or more conventional ways of writing characters in a particular linguistic language to aid in determining the trajectory information of each stroke of the incoming or unknown character. By way of example and not limitation, the character recognition system 102 may adopt the one or more conventional ways of writing characters to be writing in a direction from left to right and writing in a direction from top to bottom. Once the character recognition system 102 partitions an incoming character into a plurality of strokes, the character recognition system 102 may apply these one or more heuristic strategies to determine, for example, a starting point and an ending point of each stroke of the incoming character. The character recognition system 102 may then pre-process the character, extract features from the character, and recognize the character as described in the foregoing embodiments.

Exemplary Methods

Figure 4:
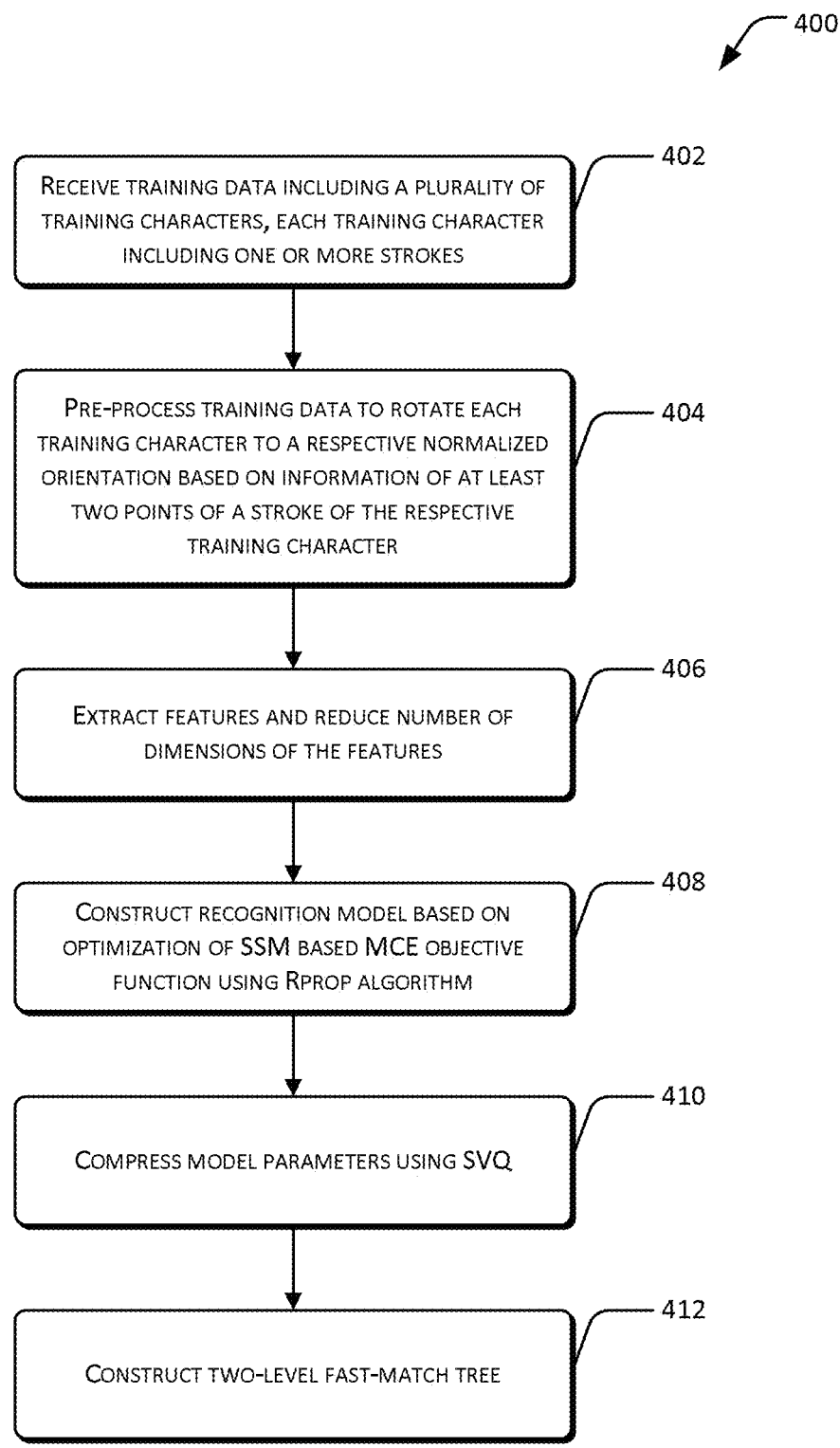
FIG. 4 illustrates an example method of training a recognition model.
Figure 5:
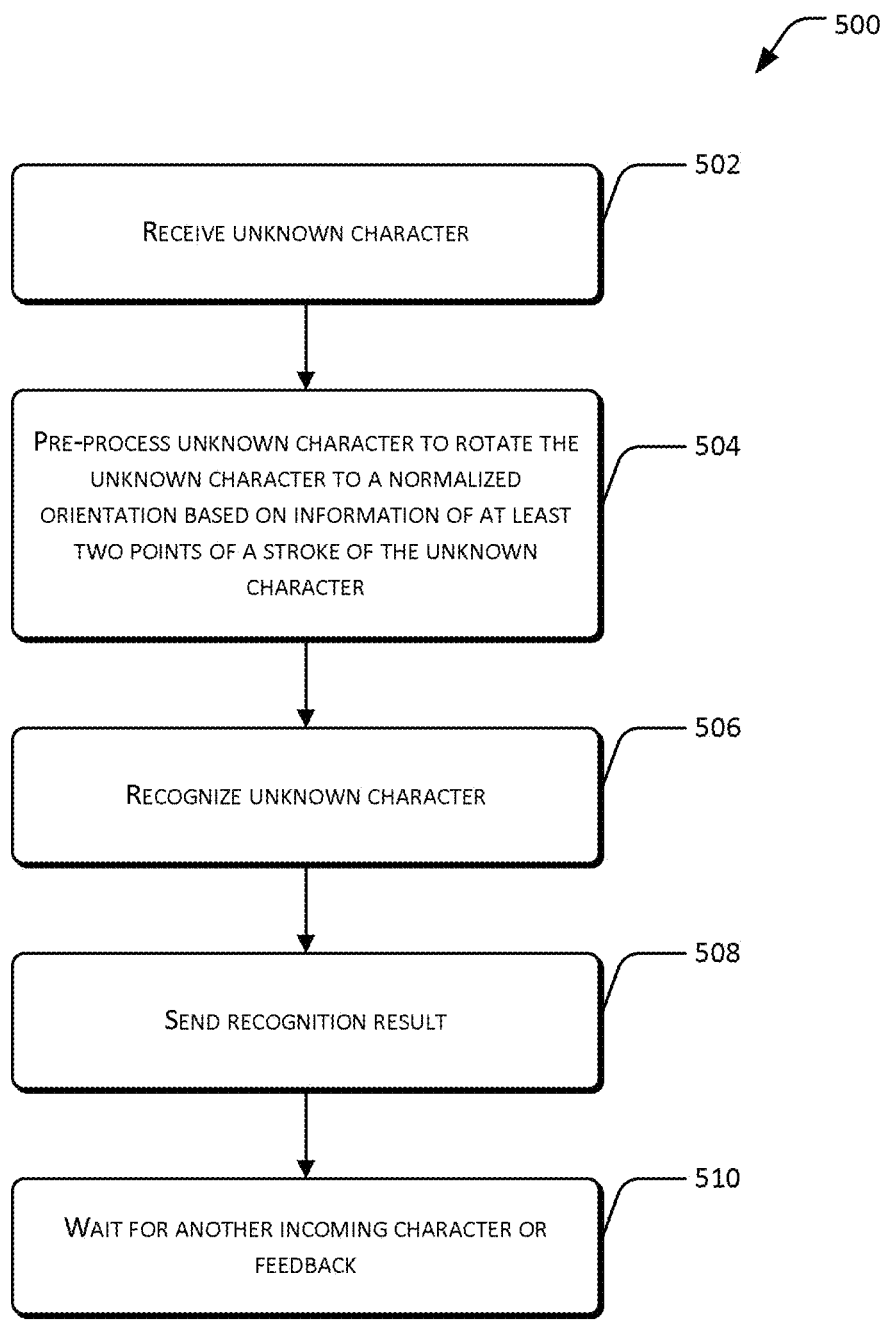
FIG. 5 illustrates an example method of recognizing a character based on a trained recognition model.

FIG. 4 is a flowchart depicting an example method 400 of training a recognition model for character recognition. FIG. 5 is a flowchart depicting an example method 500 of recognizing an incoming character based on a trained recognition model. The methods of FIG. 4 and FIG. 5 may, but need not, be implemented in the environment of FIG. 1 and using the system of FIG. 2. For ease of explanation, methods 400 and 500 are described with reference to FIGS. 1 and 2. However, the methods 400 and 500 may alternatively be implemented in other environments and/or using other systems.

Methods 400 and 500 are described in the general context of computer-executable instructions. Generally, computer-executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer-executable instructions may be located in local and/or remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 4, at block 402, the character recognition system 102 may receive training data including a plurality of characters. In one embodiment, the character recognition system 102 may receive the training data from the character database 216 or from a database in other systems such as the server 106. In some embodiments, the training data may further include respective trajectory information of the plurality of characters.

At block 404, in response to receiving the training data, the character recognition system 102 may pre-process the training data. In one embodiment, the character recognition system 102 may rotate each training character to a respective normalized orientation and/or rescale each training character to a predetermined size. For example, the character recognition system 102 may rotate a training character based on relationship between at least two points (such as a starting point and an ending point) of one or more strokes of the training character. In some embodiments, the character recognition system 102 may additionally or alternatively rescale the training character based on another relationship between at least two points of one or more strokes of the training character, e.g., a distance between a weighted sum of coordinates of starting points and a weighted sum of coordinates of ending points of one or more strokes of the character. Additionally or alternatively, the character recognition system 102 may filter noise in the training character (e.g., noises introduced in scanning the training character and/or saving the training character in a compressed or lower resolution image) based on a low-pass filter, for example.

At block 406, upon pre-processing the training characters, the character recognition system 102 may extract features from the training characters. In some embodiments, the recognition system 102 may further compress the dimension (or reduce a number of dimensions) of the features using one or more dimensionality reduction methods.

At block 408, in response to obtaining the features of the training characters, the character recognition system 102 may construct a recognition model using, for example, a clustering algorithm (e.g., LBG clustering algorithm) to obtain a multi-prototype based classifier. The character recognition system 102 may train the recognition model using a predetermined training algorithm. By way of example and not limitation, the character recognition system 102 may define an objective function using the sample-separation-margin based minimum classification error technique and optimize or minimize the defined objective function using one or more improved Rprop (i.e., Rprop−, Rprop+, iRpro− and iRprop+) algorithms.

At block 410, upon obtaining a recognition model, the character recognition system 102 may compress parameters of the recognition model, for example, using the split vector quantization technique.

At block 412, the character recognition system 102 may construct a search tree (e.g., a two-level fast-match tree) to group character classes of the recognition model into a plurality of groups to speed up recognition of incoming or unknown characters at run time.

Referring back to FIG. 5, at block 502, the character recognition system 102 may receive an incoming or unknown character inputted by the user 118 from the client device 104. The character recognition system 102 may further receive trajectory information of strokes of the incoming character during or after the user 118 writes the character through a touch screen or a tablet of the client device 104. In one embodiment, the trajectory information may include, but is not limited to, a starting point and an ending point of each stroke of the incoming character.

At block 504, in response to receiving the incoming character, the character recognition system 102 may pre-process the incoming character. For example, the character recognition system 102 may rotate and rescale the incoming character. In some embodiments, the character recognition system 102 may further filter noises from the incoming character.

At block 506, upon pre-processing the incoming character, the character recognition system 102 may recognize the incoming character using a pre-trained recognition model. In one embodiment, the character recognition system 102 may select one or more character classes of the pre-trained recognition model as one or more recognized classes for the incoming character based on respective confidence scores obtained from the pre-trained recognition model.

At block 508, upon obtaining the one or more recognized classes for the incoming character, the character recognition system 102 may send a recognition or translation result to the client device 104. In one embodiment, the character recognition system 102 may send information of the best recognized class to the client device 104. In some embodiments, the character recognition system 102 may send information of a predetermined number of best-matched (i.e., having highest confidence scores) recognized classes to the client device 104. In one embodiment, the information sent may include, but is not limited to, a typed and clear character for each recognized class sent. Additionally, in one embodiment, the information sent may further include a confidence score for each recognized class sent.

At block 510, the character recognition system 102 may wait for another incoming character or a feedback regarding the recognition result from the client device 104. In one embodiment, the feedback may include, but is not limited to, a user acceptance or rejection of the recognition result that is sent from the client device 104 with or without knowledge of the user 118. Additionally or alternatively, in some embodiments, the feedback may include information of a selection of one of the sent characters of recognized classes by the user 118.

Although the above acts are described to be performed by the character recognition system 102, one or more acts that are performed by the character recognition system 102 may be performed by the client device 104 or other software or hardware of the client device 104 and/or any other computing device (e.g., the server 106), and vice versa. For example, the client device 104 may include mechanism and/or processing capability to rotate a character and extract features from the rotated character. The client device 104 may then send these extracted features to the character recognition system 102 for character recognition.

Furthermore, the client device 104 and the character recognition system 102 may cooperate to complete an act that is described to be performed by the character recognition system 102. For example, the client device 104 may continuously send character data or extracted features of the character data to the character recognition system 102 through the network 108. The character recognition system 102 may iteratively recognize the character data or the extracted features of the character data using the pre-trained recognition model. The character recognition system 102 may continuously send a recognition or translation result of the character data to the client device 104 to allow the user 118 of the client device 104 to provide feedback about the recognition or translation result.

Any of the acts of any of the methods described herein may be implemented at least partially by a processor or other electronic device based on instructions stored on one or more computer-readable media. By way of example and not limitation, any of the acts of any of the methods described herein may be implemented under control of one or more processors configured with executable instructions that may be stored on one or more computer-readable media such as one or more computer storage media.

CONCLUSION

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. A system comprising:
one or more processors;
memory, communicatively coupled to the one or more processors, storing executable instructions that, when executed by the one or more processors, configure the one or more processors to perform acts comprising:
receiving a plurality of handwritten textual characters;
rotating each handwritten textual character to a predetermined orientation based on information of a starting point and an ending point of each stroke of each handwritten textual character;
extracting features from the plurality of rotated, handwritten textual characters;
training a character recognition model based on optimizing a sample-separation margin (SSM) based minimum classification error (MCE) objective function using a resilient propagation (Rprop) algorithm;
compressing parameters of the character recognition model using a split vector quantization (SVQ) technique; and
constructing a two-level fast-match tree for recognition of an unknown textual character at run time.

2. One or more computer storage media storing executable instructions that, when executed by one or more processors, configure the one or more processors to perform acts comprising:
receiving a plurality of textual characters;
rotating each textual character to a normalized orientation based on information of a starting point and an ending point of each of a plurality of strokes in the textual character;
extracting features of each rotated textual character; and
training a recognition model based on the extracted features of each rotated textual character, wherein the plurality of strokes comprises all strokes of the respective textual character, a predetermined number of longest strokes of the respective textual character, a predetermined percentage of longest strokes of the respective textual character, one or more strokes of the respective textual character having lengths greater than or equal to a predetermined length threshold, and/or one or more strokes of the respective textual character having lengths greater than or equal to an average length of the plurality of strokes.

3. The one or more computer storage media as recited in claim 2, the acts further comprising compressing parameters of the trained recognition model using a split vector quantization technique.

4. The one or more computer storage media as recited in claim 2, the acts further constructing a two-level fast-match tree for use at run time to aid in recognition of an unknown textual character using the trained recognition model.

5. The one or more computer storage media as recited in claim 2, wherein the rotating each textual character comprises:
computing a first coordinate as a first weighted sum of coordinates of the starting points of the plurality of strokes of the respective textual character;
computing a second coordinate as a second weighted sum of coordinates of the ending points of the plurality of strokes of the respective textual character; and
aligning a line between the first coordinate and the second coordinate in the normalized direction.

6. The one or more computer storage media as recited in claim 5, wherein the first weighted sum or the second weighted sum comprises:
an average sum of the coordinates of the starting points or the ending points, or a sum of the coordinates of the starting points or the ending points with coefficients weighted with lengths of strokes associated with the coordinates of the starting points or the ending points.

7. The one or more computer storage media as recited in claim 2, wherein the training comprises training the recognition model based on a sample-separation-margin (SSM) based minimum classification error (MCE) objective function using a resilient propagation (Rprop) algorithm.

8. A computer-implemented method comprising:
receiving a textual character comprising multiple strokes; and
computing directions of the multiple strokes from first ones of at least two points of the multiple strokes to second ones of the at least two points of the multiple strokes;
computing a vector sum direction as a vector sum of the directions of the multiple strokes; and
rotating the textual character to cause the vector sum direction to align with a normalized direction.

9. The method as recited in claim 8, further comprising recognizing the rotated textual character based on a recognition model.

10. The method as recited in claim 8, wherein the at least two points comprise a starting point and an ending point of a respective stroke of the multiple strokes.

11. The method as recited in claim 8, further comprising:
computing a first coordinate as a first weighted sum of coordinates of starting points of a subset of the multiple strokes; and
computing a second coordinate as a second weighted sum of coordinates of ending points of the subset of the multiple strokes, wherein the rotating further comprises rotating the textual character to cause a line between the first coordinate and the second coordinate to align with the normalized direction.

12. The method as recited in claim 11, wherein the first weighted sum or the second weighted sum comprises:
an average sum of the coordinates of the starting points or the ending points, or a sum of the coordinates of the starting points or the ending points with coefficients weighted with lengths of the subset of the multiple strokes associated with the coordinates of the starting points or the ending points.

13. The method as recited in claim 11, wherein the subset of the multiple strokes comprises all strokes of the multiple strokes, a predetermined number of longest strokes of the multiple strokes, a predetermined percentage of longest strokes of the multiple strokes, a stroke of the multiple strokes having lengths greater than or equal to a predetermined length threshold, and/or a stroke of the multiple strokes having lengths greater than or equal to an average length of the multiple strokes.

14. The method as recited in claim 8, wherein the rotating is independent of an order of the multiple strokes of the textual character written by a user.

15. The method as recited in claim 8, wherein the receiving comprises receiving coordinates of starting points and ending points of the multiple strokes of the textual character.

16. The method as recited in claim 8, further comprising determining starting points and ending points of the multiple strokes without knowing or tracking directions of writing of the multiple strokes.

17. The method as recited in claim 16, where the conventions of writing the stroke comprise writing from left to right and writing from top to bottom.

18. The method as recited in claim 8, further comprising determining starting points and ending points of the multiple strokes based on heuristic assumptions of conventions of writing a stroke.

* * * * *